(12) United States Patent
Iwasaki

(10) Patent No.: US 6,804,425 B2
(45) Date of Patent: Oct. 12, 2004

(54) OPTICAL HEAD

(75) Inventor: Yasunori Iwasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/439,253

(22) Filed: May 15, 2003

(65) Prior Publication Data

US 2003/0198443 A1 Oct. 23, 2003

Related U.S. Application Data

(63) Continuation of application No. 09/812,721, filed on Mar. 20, 2001, now Pat. No. 6,644,867.

(30) Foreign Application Priority Data

Mar. 31, 2000 (JP) ........................................ 2000-099916

(51) Int. Cl.⁷ ................................................ G02B 6/12
(52) U.S. Cl. ............................. 385/14; 385/89; 385/91
(58) Field of Search ............................. 385/88, 89, 91, 385/92, 52, 14

(56) References Cited

U.S. PATENT DOCUMENTS

| | | | | |
|---|---|---|---|---|
| 4,523,802 A | * | 6/1985 | Sakaguchi et al. | 372/36 |
| 4,807,956 A | * | 2/1989 | Tournereau et al. | 385/91 |
| 4,834,492 A | * | 5/1989 | Ishii et al. | 385/91 |
| 4,995,025 A | * | 2/1991 | Schulze | 359/8 |
| 4,997,243 A | * | 3/1991 | Tournereau et al. | 385/92 |
| 5,675,685 A | * | 10/1997 | Fukuda et al. | 257/98 |
| 5,745,625 A | * | 4/1998 | Aikiyo et al. | 385/33 |
| 5,787,215 A | * | 7/1998 | Kuhara et al. | 385/88 |
| 6,332,719 B1 | * | 12/2001 | Nishikawa et al. | 356/401 |
| 6,332,721 B1 | * | 12/2001 | Inokuchi | 385/147 |
| 6,360,035 B1 | * | 3/2002 | Hurst et al. | 385/16 |

FOREIGN PATENT DOCUMENTS

| | | |
|---|---|---|
| EP | 0 611 142 A1 | 8/1994 |
| EP | 0 644 442 A1 | 3/1995 |
| EP | 0 704 732 A1 | 4/1996 |

OTHER PUBLICATIONS

Masaaki Takaya, Shinji Nagasawa and Yasuji Murakami, *Design and Performance of Very High–Density Multifiber Connectors Employing Monolithic 60–Fiber Ferrules*, IEEE Photonics Technology Letters, vol. II, No. 11, Nov. 1999, pps 1446–1448.

Toshiaki Satake, Toru Arikawa, P. William Blubaugh, Craig Parsons and Toshi K. Uchida, *MT Multifiber Connectors and New Applications*, Proceedings of the Electronic Components and Technology Conference, Washington, May 1–4, 1994, New York, IEEE, US, vol. CONF. 44, May 1, 1994, pps 994–999.

* cited by examiner

*Primary Examiner*—Frank G. Font
*Assistant Examiner*—Kaveh C Kianni
(74) *Attorney, Agent, or Firm*—Burr & Brown

(57) ABSTRACT

An optical head includes a mount material 30 having an optical element 10 fixed thereto and a mount material 40 having an optical fiber array 20 fixed thereto. An optical fiber 21, which is included in the optical fiber array, is optically connected to the optical element 10. An angle formed between the light emission receiving face 10a of the optical element 10 and an inclined face of the mount material 40 is 1–8 degrees.

1 Claim, 3 Drawing Sheets

OPTICAL HEAD

CROSS REFERENCE TO RELATED APPLICATION

This application is a continuation of U.S. application Ser. No. 09/812,721, filed Mar. 20, 2001, now U.S. Pat. No. 6,644,867, the entirety of which is incorporated herein by reference.

BACKGROUND OF THE INVENTION

1. Field of the Invention

The present invention relates to an optical head comprising mount materials onto which an optical element and an optical fiber array are fixed, more particularly to such optical heads including an angle formed between a light emitting/receiving face of the optical element and an inclined face of a mount material for fixing the optical fiber array.

2. Description of Related Art

A conventional optical head includes a mount material for fixing an optical element, such as a light receiving element or light emitting element and a mount material for fixing an optical fiber array to which an optical fiber is connected, and the optical fiber is optically connected to the optical element.

FIG. 3 shows an optical head having a conventional light emitting element. An LD array 10 is provided such that a plurality of laser diodes are transversely arranged. A mount material 30 is made of a AIN ceramics with high heat conductivity, metalization for soldering is applied to its surface, and a wiring, pattern 31 and a drive IC 35 bonded by an electrode of the LD array 10 and a wire 32 are arranged. The LD array 10 is fixed to the mount material 30 by means of soldering so that light emissions ejected from the LD array 10 are generally coincident with each other.

An optical fiber array 20 includes at least one V groove 23 provided on a support substrate 22 in order to position an optical fiber 21, and a plurality of optical fibers 21 are arranged to be housed in the V grooves 23. These optical fibers are covered with a cap substrate 24 from the top, and are fixed by sheet shaped soldering, thereby forming an integral block 25.

At a position between the optical fiber array 20 and the LD array 10 optically coupled with each other, a support substrate 22 is protruded on the top face of a mount body 40; a spacer portion 34 is extruded on the side face of the mount material 40, and the spacer portion 34 is bonded with the side face of the mount body 40. In addition, this optical head is sealed with air tightness in a package by leading out an optical fiber or lead wire, whereby a parallel light transmission module is provided. In addition, an end face 20a of the optical fiber 21, with which the LD array 10 is optically coupled, is positioned at an end face of a block 25, and is formed so as to be opposed to a light emission plane 10a of the mount material 30 having the LD array 10 mounted thereon.

Next, in order to directly emit light from a light emitting element to a large diameter end face of an optical fiber or to emit the light expanded or contacted by a lens, an interval between a light emission element required for fine adjustment and the end face of the optical fiber is spaced, adjusted, and fixed when a connection face between mounted materials fixed to each other is defined as a reference. This derives from light intensity in a direction orthogonal to an optical axis of an optical element for example, a laser diode and light intensity averaging between a plurality of fibers of the optical head after light axis alignment.

That is, the light intensity in a direction orthogonal to an optical axis of a laser diode draws a Gaussian curve shape when an optical axis is defined as a center axis. However, when a point orthogonal to the optical axis is spaced from a laser diode, a top of the curve is lowered, and the gradient is gentle. When the top of the curve is low, light intensity is lowered. On the other hand, when the gradient is gentle, even if slight deviation from the optical axis occurs in a vertical direction, it indicates that a small rapid change occurs with light intensity.

In addition, in the optical head, even if the same optical intensity is input to a plurality of configured fibers, large deviation in light intensity must not be present between fibers due to deviation from the light axis.

The arrangement precision of a plurality of optical elements and the arrangement precision of a plurality of fibers must be permitted to some extent in view of manufacture. This means that another optical element and an optical fiber deviation from an optical axis even if an arbitrary optical element and the corresponding optical fiber are completely aligned with the axis. Even under such circumference, as means for preventing large deviation in light intensity between fibers, there has been conventionally performed means for spacing an optical element and an optical fiber from each other by a predetermined value. This method utilizes the fact that, although light intensity is lowered as deviation from an optical element is more significant as described above, the variation rate of light intensity in a direction vertical to an optical axis is gentle.

Specifically, a light emission element is fixed to a mount material by means of soldering; an optical fiber is pressed by from the top arranged and housed in a support substrate having a V groove punched thereon, and is fixed by means of soldering; and the support substrate is fixed to a top face of the mount material. At this time, when an end face of the mount material fixing an optical fiber array is defined as a reference face, the fixing position of the light emission element is adjusted by the mount material via a spacer for ensuring a design space. In addition, the position of a support substrate is fine adjusted while sensing the light receiving capability of an optical fiber fixed to the support substrate against the adjustment light from the light emission element.

However, in order to ensure this spacing distance, positional adjustment is cumbersome because it is intensively influenced by the dimensional precision of a spacer and the positional precision on the mount material for the light emission element. Thus, there has been a growing need for improvement of means capable of simplifying positional adjustment using check light by improving precision of adjustment technique utilizing a reference face of the mount material.

SUMMARY OF THE INVENTION

According to a first aspect of the present invention, there is provided an optical head including a mount material for fixing an optical element and a mount material for fixing an optical fiber array. The optical fiber is optically connected to the optical element. An angle formed between a light emission/receiving face of the optical element and an inclined face of the mount material for fixing the optical fiber array is 1 to 8 degrees. In this manner, an angle formed between a light emission/receiving face and an end face of an optical fiber is greater than 1 degree. Thus, noise produced by reflection light deriving from a light receiving face or an end face of an optical fiber opposed to a light emitting/receiving element is reduced as compared with a case in which the conventional light emission/receiving face and the end face of the optical fiber are substantially parallel to each other, and a failure with optical signal transmission can be prevented. In addition, an angle formed between the light emission/receiving face and an end face of the optical fiber is smaller than 8 degrees, and thus, bonding efficiency is improved. In addition, an end face can be shaved with high processing precision, and thus, the shaved portion can act as the above spacing distance. Therefore, the spacing distance can be ensured with high precision.

According to a second aspect of the present invention, there is provided an optical head wherein thermal expansion rates of the mount material of the optical element and the mount material of the optical fiber array are substantially equal to a thermal expansion rate of the optical fiber array material. In this manner, the thermal expansion rates of mount materials is substantially identical to each other. Thus, even if these materials are used under severe environments such that a temperature difference is large, there is no thermal contraction difference between the mount materials, and an axial deviation in optical signals fixed thereto and transmitted does not occur.

Further, according to a third embodiment of the present invention, there is provided an optical head wherein the optical fiber is a single mode, and the mount material of the optical element and the mount material of the optical fiber array are spot welded, such as Yag melded to each other. In this manner, a single mode optical fiber of 5 to 8 microns in core diameter is smaller in core portion diameter than a multiple mode optical fiber of 50 to 62.5 microns in diameter, the countdown dimensional precision up to submicron units can be precisely performed during adjustment. Moreover, the same kinds of mount materials are used. Thus, a thermal shrinkage difference is small, and an axial deviation in optical signals fixed thereto and transmitted does not occur.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

DETAILED DESCRIPTION OF THE INVENTION

Figure 1:
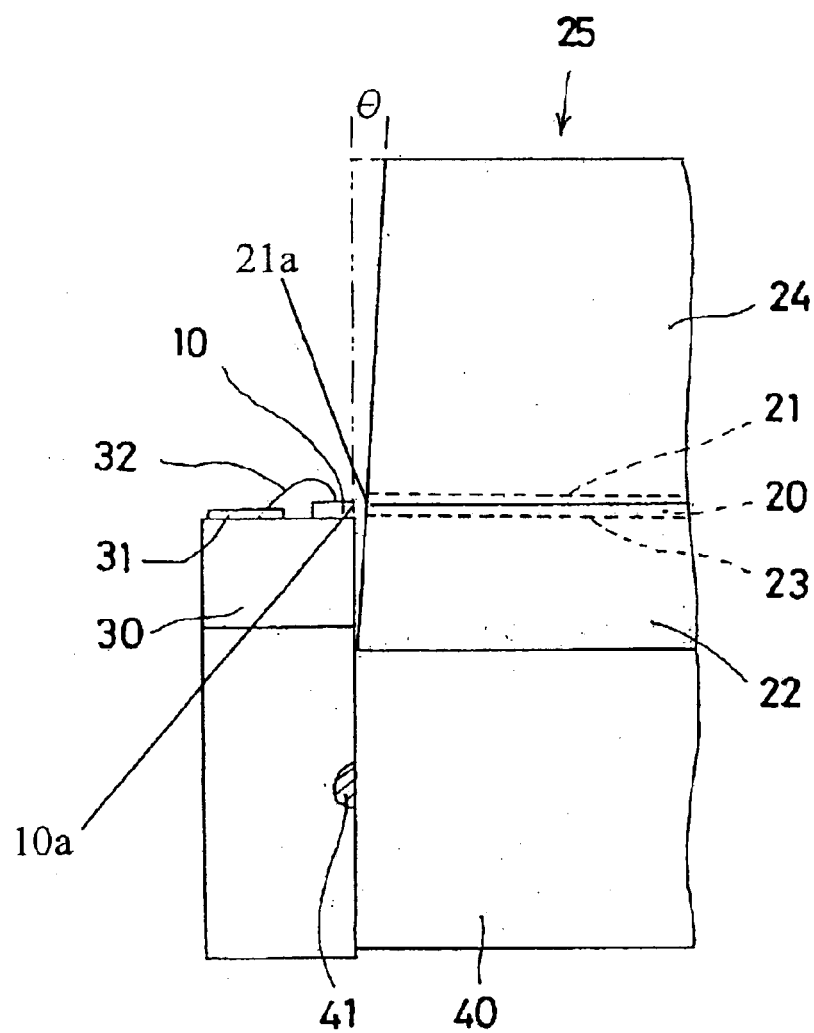
FIG. 1 is an illustrative view illustrating an optical head having a light emitting/receiving element according to the present invention.

Reference will now be made in detail to the presently preferred embodiments of the invention as illustrated in the accompanying drawings, in which like reference numerals designate like or corresponding parts.

Figure 2:
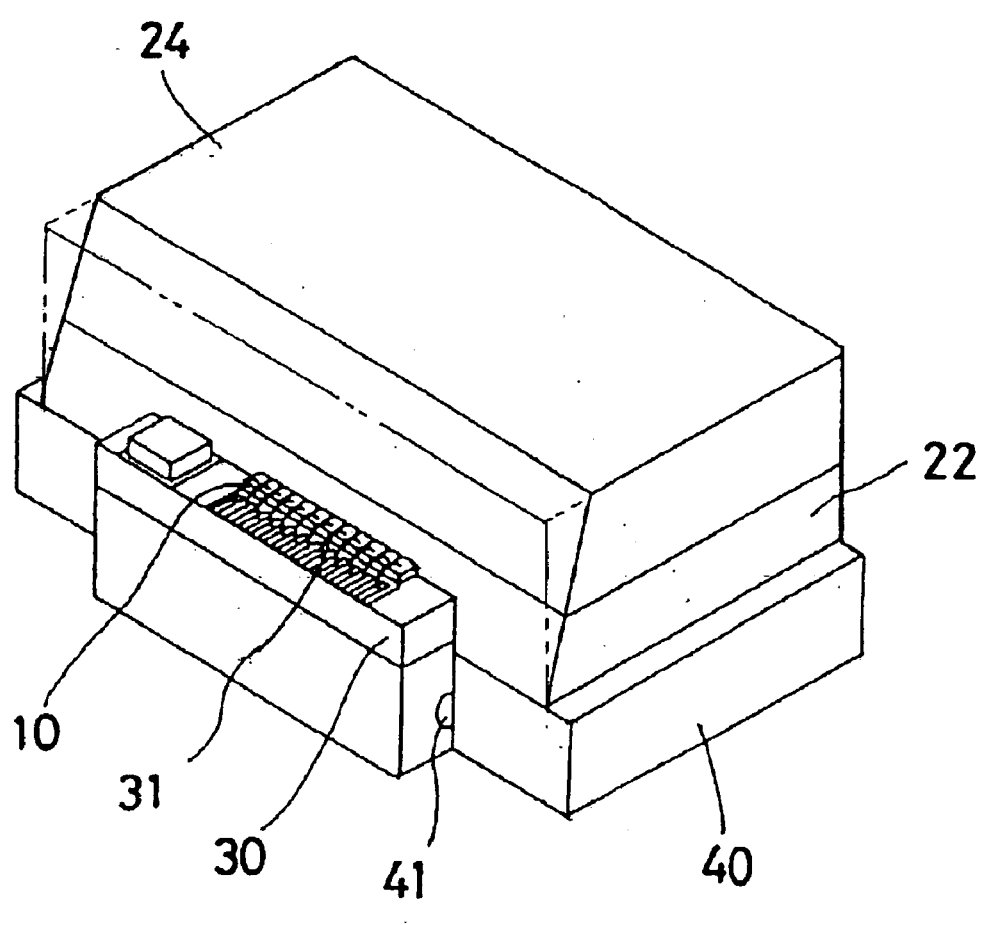
FIG. 2 is a perspective view showing an optical head having the light emitting/receiving element shown in FIG. 1.
Figure 3:
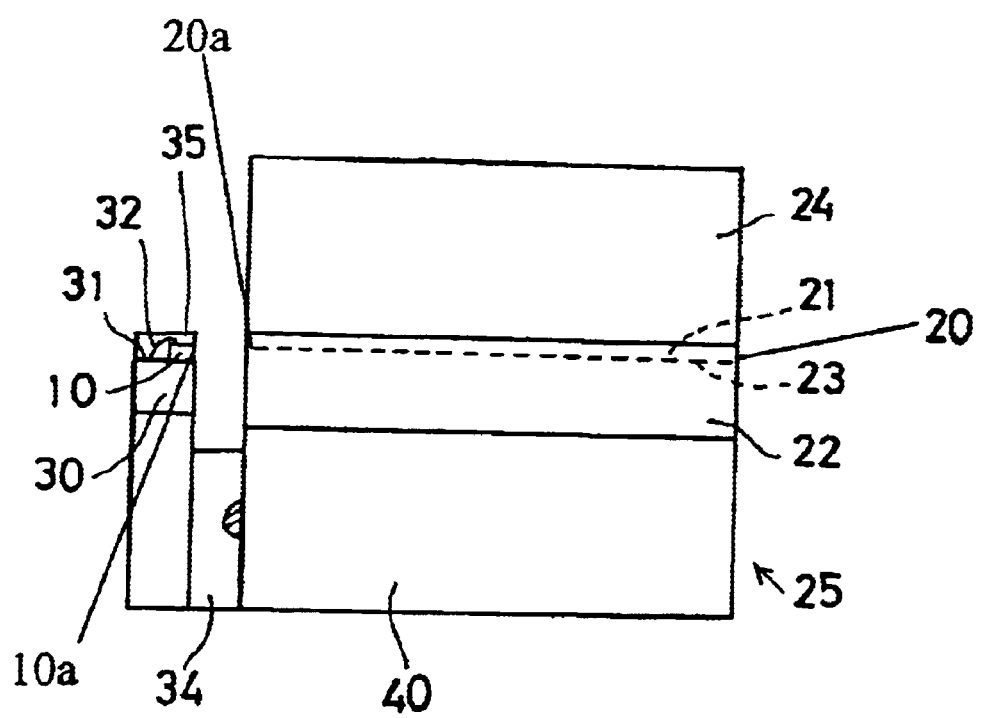
FIG. 3 is an illustrative view illustrating a conventional optical head having a light emitting/receiving element.

Hereinafter, preferred embodiments of the present invention will be described with reference to the accompanying drawings. FIG. 1 is an illustrative view illustrating an optical head having a light emitting/receiving element according to the present invention. FIG. 2 is a perspective view showing the optical head.

The optical head includes an LD array 10, which is driven by an IC and emits light. An optical fiber array 20 arranges and fixes a plurality of optical fibers 21. A mount material 30 fixes the LD array 10, and a mount material 40 fixes the optical fiber array 20. The optical head is optically coupled with an optical fiber 21 in the LD array 10.

The LD array 10 has a plurality of semiconductor lasers transversely arranged thereon. The mount material 30 is made of a SiC ceramics with high thermal conductivity, metalization for soldering is applied onto its surface, and a wiring pattern 31 bonded by an electrode of the LD array 10 and a wire 32 is arranged. The light is ejected from the LD array 10, which is fixed to the mount material 30 by means of soldering with the LD arrays 10 being aligned on their end faces so as to be generally horizontal in a horizontal direction.

A V groove 23 is punched on a support substrate 22 in order to position an optical fiber 21. A plurality of optical fibers 21 are housed and arranged on V groove 23, and a cap substrate 24 is covered over the fibers and fixed by sheet shaped soldering, thereby forming an integral block 25. Then, at a position at which the optical fiber array 20 and the LD array 10 are optically coupled with each other, a mount material 30 of the LD array 10 is bonded with the side face of the mount body 40 at a spot welding portion 41 by Yag lasers. This bonding is done by spot welding, and thus, there is no substantial welding strain, and desired optical coupling does not break.

In addition, this optical head is sealed with air tightness in a package by leading out an optical fiber or lead wire, whereby a parallel light transmission module is provided.

An end face 21a of the optical fiber 21 with which the LD array 10 is optically coupled is positioned on an inclined face of a block 25. An inclined angle θ is defined as 2 degrees relevant to the light emitting/receiving plane of the mount material having the opposite LD array 10 mounted thereon. This inclined angle θ is properly 1 to 8 degrees. When an angle formed between a light emitting/receiving face 10a and the end face 21a of the optical fiber 21 is greater than 1 degree, a desired spacing distance can be ensured. In addition, in comparison with the fact that a conventional light emission/receiving face and an end face of the optical fiber are substantially parallel to each other, noise produced by reflection light deriving from the end face of the optical fiber opposed to the light emitting/receiving element is reduced. Accordingly, a failure with optical signal transmission can be prevented. Moreover, a gap can be formed by shaving the end face with high processing precision. Still moreover, the angle θ formed between the light emission/receiving face 10a and the end face 21a of the optical fiber is smaller than 8 degrees, and thus, coupling efficiency is improved. The shown inclined angle θ is indicated in an exaggerated manner, and a two-dot chain line indicates the external line of a conventional box-shaped block.

With respect to this inclined face, after a block 25 is integrally formed to be in a box shape, an end of the optical fiber 21 protruding from the block 25 is cut, and at the same time, an inclined face is shaved. In addition, its inclined face is optically ground and finished. In this manner, alignment with the LD array 10 is facilitated when the mount body 40 fixing the block 25 is defined as a reference face, and a gap between the LD array 10 and the end face of the optical fiber 21 can be easily adjusted by adjusting a shaving angle of the inclined face.

As has been described above, an optical head according to the present invention is capable of reducing noise produced by reflection light deriving from an end face of an optical fiber opposed to a light receiving face or light emitting element as compared with a conventional optical head in which a light emission/receiving face and an end face of an optical fiber are substantially parallel to each other; preventing an optical signal transmission failure; and shaving an end face with high processing precision. In addition, an angle formed between the light emission/receiving face and the end face of the optical fiber is smaller than 8 degrees, and thus, an optical head with high coupling efficiency can be provided without using a spacer.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An optical head comprising a mount material for fixing an optical element and a mount material for fixing an optical fiber array, the optical fiber array being optically connected to the optical element, wherein an angle formed between a light emission/receiving face of the optical element and an inclined face of the mount material for fixing the optical fiber array is 1 to 8 degrees.

* * * * *